US008090794B1

(12) United States Patent
Kilat et al.

(10) Patent No.: US 8,090,794 B1
(45) Date of Patent: Jan. 3, 2012

(54) TECHNIQUE FOR CUSTOMIZING DISPLAYED CONTENT

(75) Inventors: Kyle G. Kilat, Mountain View, CA (US); Joseph W. Lasee, Santa Clara, CA (US); Vladimir Magdalin, Citrus Heights, CA (US); Rajan V. Patel, San Francisco, CA (US); Marcus Tad Milbourn, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 337 days.

(21) Appl. No.: 12/197,557

(22) Filed: Aug. 25, 2008

(51) Int. Cl.
    *G06F 15/16* (2006.01)
(52) U.S. Cl. .......................... 709/217; 709/203; 709/226
(58) Field of Classification Search .................. 709/203, 709/217, 226
    See application file for complete search history.

(56) References Cited

U.S. PATENT DOCUMENTS

| | | | | |
|---|---|---|---|---|
| 5,933,827 A | * | 8/1999 | Cole et al. ................ | 707/999.01 |
| 5,991,735 A | * | 11/1999 | Gerace ............................ | 705/10 |
| 5,999,975 A | * | 12/1999 | Kittaka et al. ................. | 709/224 |
| 6,687,696 B2 | * | 2/2004 | Hofmann et al. ...... | 707/999.006 |
| 6,732,090 B2 | * | 5/2004 | Shanahan et al. ............. | 715/210 |
| 6,957,390 B2 | * | 10/2005 | Tamir et al. .................... | 715/744 |
| 6,981,040 B1 | * | 12/2005 | Konig et al. ................... | 709/224 |
| 2003/0131070 A1 | * | 7/2003 | Stroebel et al. ............... | 709/217 |
| 2006/0136589 A1 | * | 6/2006 | Konig et al. ................... | 709/224 |
| 2006/0184641 A1 | * | 8/2006 | Moetteli ........................ | 709/217 |
| 2006/0294199 A1 | * | 12/2006 | Bertholf ........................ | 709/217 |

* cited by examiner

*Primary Examiner* — Phuoc Nguyen
(74) *Attorney, Agent, or Firm* — Park, Vaughan, Fleming & Dowler LLP (57) ABSTRACT

Embodiments of a computer system, a method, and a computer-program product (e.g., software) for use with the computer system are described. These embodiments may be used to customize displayed content in a document, such as a web page or a user interface in a software application. In particular, by monitoring user activities while one or more users view the document during multiple sessions, the computer system can identify the most relevant content at a particular time. Then, the computer system selectively modifies the displayed content in the document based on the monitored user activity. For example, the computer system may selectively filter the content in the document so that a subset of the content is displayed. Moreover, the displayed content may be dynamically revised based on subsequent user actions.

26 Claims, 7 Drawing Sheets

TECHNIQUE FOR CUSTOMIZING DISPLAYED CONTENT

BACKGROUND

The present invention relates to techniques for customizing displayed content in a document based on user activity.

When presenting information to a user, it is often challenging to make sure that it is easy to understand and to use. These challenges are even greater in dynamic environments where the information is changing and growing in size.

For example, many websites, such as social networks, encourage users to contribute content, which is then instantaneously displayed on the websites. However, over time, popular websites can become very complicated, including multiple types of content, multiple 'conversations' (in which groups of users interact with each other), and multiple links to related websites. As a consequence, these websites can become visually cluttered, which makes it increasingly difficult for users to find relevant or interesting information on them (such as recently added or popular content). This degradation in the ability of users to effectively use such websites has a negative impact on the user experience, which can limit or even decrease the popularity of these websites, with a commensurate impact on advertising revenue.

Similar problems occur in user interfaces. For example, many software applications include multiple functions. However, as the number of functions grows, it becomes increasingly difficult for users to find desired functions amid a sea of possibilities. Consequently, most users are only aware of and only use a small subset of the capabilities of a given software application, which obviates the advantages of the unused (indeed, often unknown) capabilities. In addition, the need to maintain a familiar (albeit crowded) user interface prevents software developers from adding new features or improving suboptimal user interfaces.

SUMMARY

One embodiment of the present invention provides a computer system that customizes displayed content in a document. During operation, the computer system monitors user activity while one or more users view the document during multiple sessions. Then, the computer system selectively modifies the displayed content in the document based on the monitored user activity.

This selective modification of the displayed content may involve selectively filtering content in the document so that a subset of the content is displayed, where the displayed content includes one or more icons that, when activated, allow the one or more users to access a remainder of the content. For example, the one or more icons may include one or more links to additional documents. Moreover, if a given icon is activated by a given user, at least some of the remainder of the content may be displayed in the document.

Note that the selective filtering may be performed dynamically as the user activity evolves or changes. For example, the computer system may adjust the displayed content based on user activity after the selective modification. Thus, if one or more users activate the given icon to display content that is currently hidden, this content may be subsequently added to the displayed content.

Additionally, the selective modification may involve altering a format of at least a portion of the displayed content, such as highlighting the portion of the displayed content.

A wide variety of documents may be customized, including: a user interface for a software application; a social forum that is viewed by multiple users who can add content to the document; and/or a web page that is accessed via a network. For example, the displayed content may include one or more functions of the software application, and the selective modification may limit a total number of function icons in the user interface to a pre-determined range of numbers.

Note that the multiple sessions may include one or more previous sessions and/or current sessions for the one or more users. Moreover, the one or more users may include a group of users. Alternatively, the one or more users may include an individual, thereby allowing the displayed content to be personalized.

In some embodiments, the selective modification is based on user activity of the group of users while viewing multiple documents (which include the document). Moreover, the selective modification may be based on a data rate of a link to a device that displays the displayed content. Additionally, the selective modification may be based on a weighted summation of user activities, where different weights are associated with different subsets of the content in the document and different user activities.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer-program product (e.g., software) for use with the computer system are described. These embodiments may be used to customize displayed content in a document, such as a web page or a user interface in a software application. In particular, by monitoring user activities while one or more users view the document during one or more sessions, the computer system can identify the most relevant content at a particular time. Then, the computer system selectively modifies the displayed content in the document based on the monitored user activity. For example, the computer system may selectively filter the content in the document so that a subset of the content is displayed. Moreover, the displayed content may be dynamically revised based on subsequent user actions.

By dynamically customizing the displayed content, the computer system and the technique allow providers of websites and developers of software applications to significant increase the usefulness of their products. In contrast with existing products, these embodiments allow users to readily find and use relevant content in products that include dynamic user-supplied content and/or multiple functions/features. Moreover, companies can readily update or modify these products without confusing or alienating customers. This ease of use increases customer productivity, customer satisfaction and customer loyalty. It may also allow the products to be differentiated in the marketplace, with a commensurate impact on revenue and profitability.

Figure 1A:
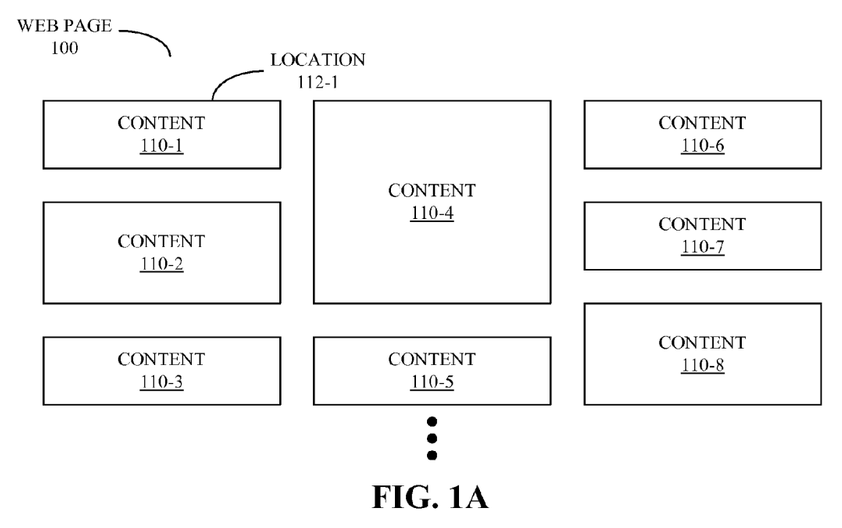
FIG. 1A is a drawing illustrating a web page in accordance with an embodiment of the present invention.

We now describe embodiments of a computer system, a method, and software for customizing displayed content in a document. FIG. 1A presents a drawing illustrating a web page 100 that includes user-supplied content 110 at different locations, such as location 112-1. For example, in many collaborative systems (such as social networks, forums, blogs, online reviews, and online encyclopedias), users are encouraged to provide content and comments, thereby creating a virtual environment that promotes social interaction. However, as these virtual 'conversations' and exchanges of information progress, the amount of content on a given web page increases. Eventually, web pages (such as web page 100) become unwieldy, because there is too much content and users are no longer able to navigate these web pages to find relevant content, e.g., content that is of interest to them.

Figure 1B:
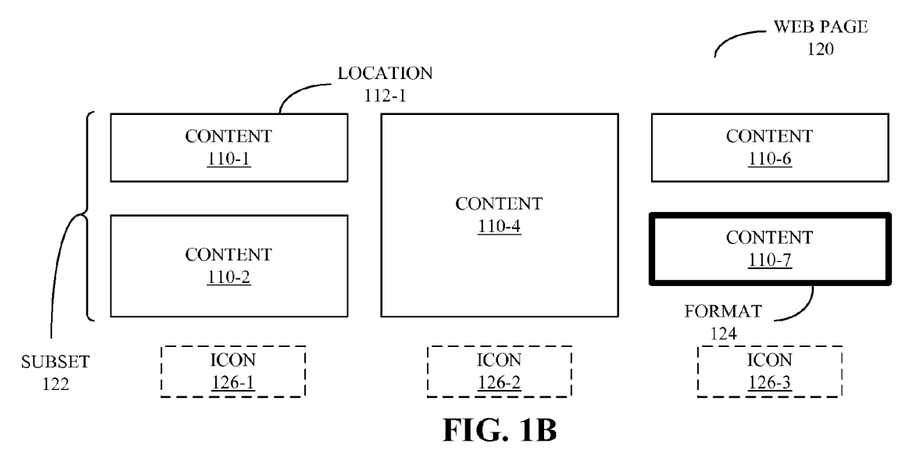
FIG. 1B is a drawing illustrating a web page that customizes displayed content in the web page of FIG. 1A in accordance with an embodiment of the present invention.

This problem can be addressed by selectively modifying the displayed content based on content that is relevant or of interest to one or more users. For example, the relevant content may be identified by monitoring user activities (such as accessing or providing content 110) while one or more users view or interact with web page 100 during one or more sessions (including one or more previous sessions and/or current sessions of the one or more users). Such customizing of content 110 in web page 100 is shown in FIG. 1B, which presents a drawing illustrating a web page 120. In particular, content 110 in web page 100 (FIG. 1A) has been selectively filtered so that a subset 122 of this content is displayed in web page 120. A remainder of the content 110 in web page 100 (FIG. 1A) may be hidden, minimized and/or less prominent in web page 120. In addition, a format 124 of at least a portion of the displayed content in web page 120 (such as content 110-7) may be altered (relative to the format in web page 100 in FIG. 1A), thereby highlighting at least the portion of the displayed content. This format change can include: a different font, a different color, bold characters, underlining, and/or additional visual or audio effects.

Figure 1C:
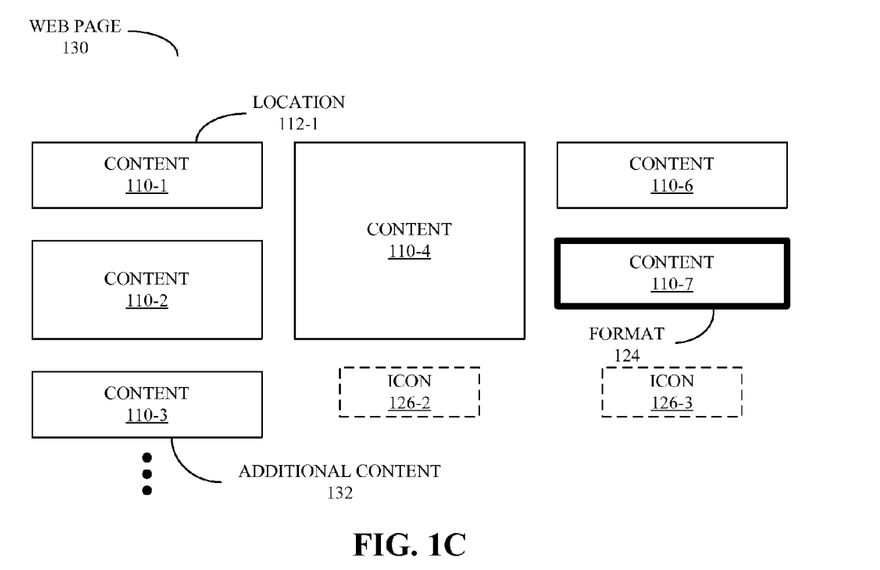
FIG. 1C is a drawing illustrating a web page that displays additional content in addition to the displayed content in the web page of FIG. 1B in accordance with an embodiment of the present invention.

Web page 120 may also include one or more icons 126 (which may include links to additional web pages) that, when activated, allow users to access the remainder of the content 110 in web page 100 (FIG. 1A), which is hidden or not displayed prominently in web page 120. If a user activates an icon, such as icon 126-1, at least some of the remainder of the content 110 in web page 100 (FIG. 1A) may be displayed. This is shown in FIG. 1C, which presents a drawing illustrating a web page 130 that displays additional content 132 in addition to the displayed content in web page 120 (FIG. 1B).

The selective filtering of content in web page 120 (FIG. 1B) may be dynamically updated or revised as the user activities evolve or change. Thus, computer systems 200 in FIG. 2 and 300 in FIG. 3, which can be used to implement the selective modifying, can 'learn' what constitutes the relevant content for a given user at a particular time. For example, the displayed content may be adjusted based on user activity after the initial selective modification of web page 100 (FIG. 1A). Thus, if one or more users activate icon 126-1 (FIG. 1B) to display additional content 132, this additional content may eventually be added to the displayed content in web page 120 (FIG. 1B). Similarly, additional content, which is provided by users after the initial selective modification of web page 100 (FIG. 1A), may be added to the displayed content in web page 120 (FIG. 1B).

In an exemplary embodiment, the selective modification is based on a weighted summation of user activities, where different weights may be associated with: different subsets of the content 110 in web page 100 (FIG. 1A) that the one or more users provided or accessed (for example, by clicking on links or icons, such as those that expand or minimize content), and/or different user activities (such as when users accessed content, did not access the content, and/or provided the content). If the weighted summation of the user activities associated with a subset of content 110 in web page 100 (FIG. 1A) is less than a threshold, then this subset may not be included in the subsequently displayed content in web page 120 (FIG. 1B). Alternatively or additionally, another subset of the content that is of interest (such as content that is popular, e.g., which is viewed regularly and which has a weighted sum that exceeds a threshold) may be highlighted in the displayed content in web page 120 (FIG. 1B). Note that different thresholds may be used for the weighted summations for user activities associated with different subsets of the content 110 in web page 100 (FIG. 1A).

Additional factors or variables may be used to determine how to selectively modify the content in web page 100 (FIG. 1A), for example, by changing the different weights that are used when determining weighted summations of user activities. In particular, the displayed content in web page 120 (FIG. 1B) may be based on user preferences in a user profile (such as metadata), which is provided by the one or more users during a registration procedure. These user preferences may include topics or subjects that a user is interested in or that the user doesn't like. Alternatively or additionally, the selective modification may be based on a data rate of a link to an electronic device that displays the displayed content in web page 120 (FIG. 1B). For example, communication with a portable electronic device (such as a cellular telephone) via a network may have reduced bandwidth relative to another electronic device (such as a desktop computer). As a consequence, subset 122 (FIG. 1B) in web page 120 (FIG. 1B) may include less content when displayed on a portable electronic device than when displayed on the other electronic device.

This technique for customizing displayed content may be used to customize the content displayed for individual users. Thus, the one or more users may include one user, thereby allowing the displayed content in web page 120 (FIG. 1B) to be personalized.

However, such personalization of content can be difficult, especially if it is based on very limited statistics (such as when the one user hasn't visited or viewed the content 110 on web site 100 in FIG. 1A very often or for very long). This problem may be addressed by aggregating user activity for the one user which is associated with multiple (related) web pages (including web page 100 in FIG. 1A). Alternatively, collaborative filtering may be used, i.e., the one or more users may include a group of users, and the user activities of this group may be used to selectively modify the content 110 in web page 100 (FIG. 1A) when it is displayed in web page 120 (FIG. 1A) for members of this group and/or for other individuals who have similar interests (e.g., as indicated by their user preferences). Once again, the user activities for the group may be associated with multiple (related) web pages (including web page 100 in FIG. 1A).

Figure 1D:
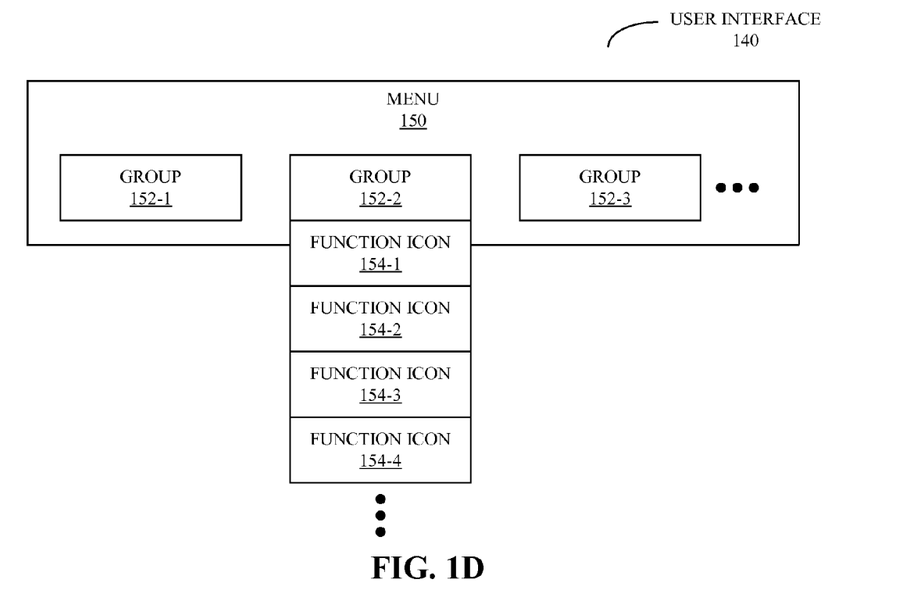
FIG. 1D is a drawing illustrating a user interface for a software application in accordance with an embodiment of the present invention.

This technique for customizing displayed content may be used with a wide variety of documents in addition to web pages, including a user interface for a software application. For example, FIG. 1D presents a drawing illustrating a user interface 140 of a software application in which there are multiple features/functions that are arranged in a menu 150 in groups 152. If a user activates or clicks on a symbol for a given group (such as group 152-2), function icons 154 are displayed. However, if there are too many groups 152 and/or too many function icons 154, user interface 140 may become cluttered and difficult for users to use.

Figure 1E:
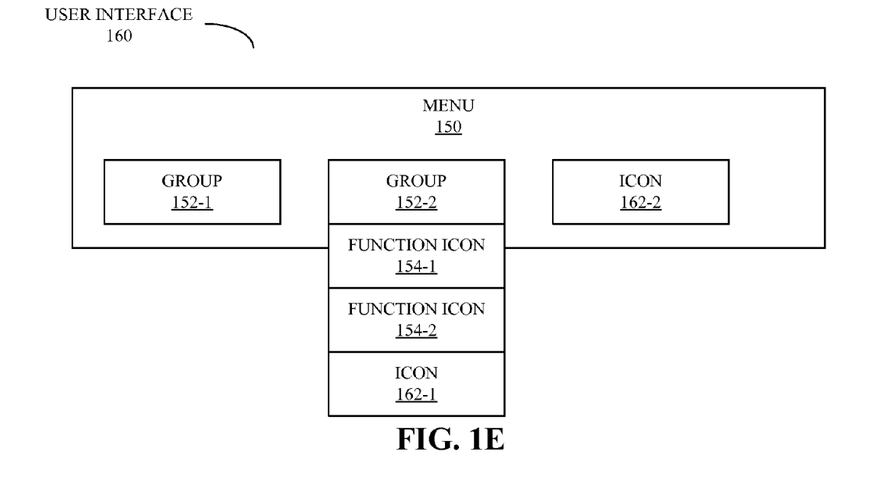
FIG. 1E is a drawing illustrating a user interface that customizes displayed function icons in the user interface of FIG. 1D in accordance with an embodiment of the present invention.

This problem can be addressed by selectively modifying the displayed content based on the interests of one or more users. For example, the relevant content may be identified by monitoring user activities (such as using or not using particular function icons 154) while one or more users use the software application during one or more sessions (including one or more previous sessions and/or current sessions of the one or more users). As shown in FIG. 1E, which presents a drawing illustrating a user interface 160 that customizes displayed icons in user interface 140 (FIG. 1D), a subset of the groups 152 and/or the function icons 154 (when the user activates or clicks on a given group, such as group 152-2) may be displayed based on the monitored user activities. A total number of groups 152 and/or function icons 154 in the user interface 160 may be limited to a pre-determined range of numbers (such as five or ten), thereby simplifying user interface 160 and enhancing user productivity and satisfaction with the software application.

Figure 1F:
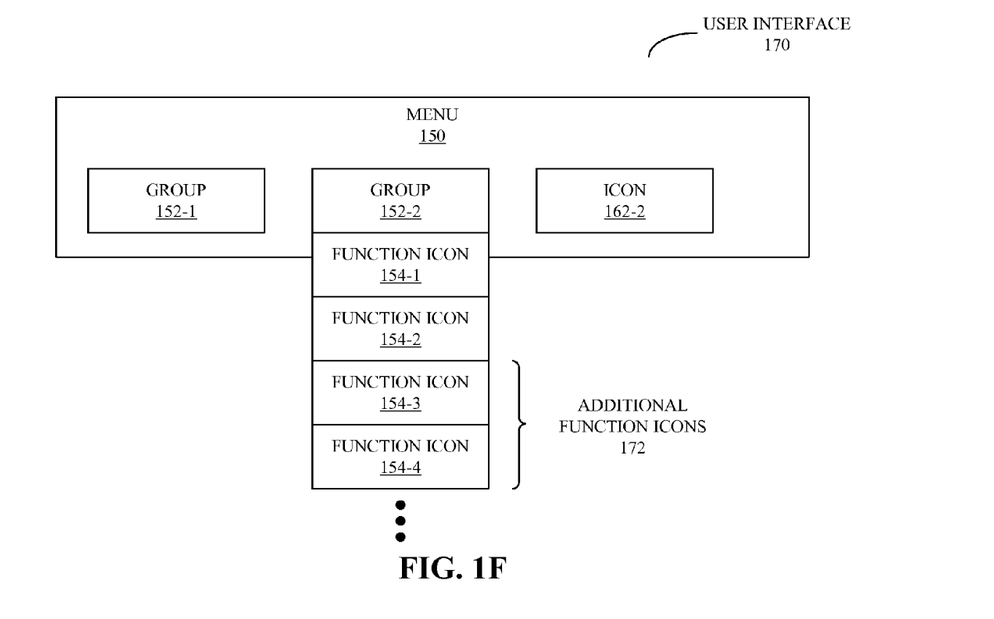
FIG. 1F is a drawing illustrating a user interface that displays additional function icons in addition to the displayed function icons in the user interface of FIG. 1E in accordance with an embodiment of the present invention.

User interface 160 may include icons 162 (or links) that allow the one or more users to access a remainder of the groups 152 and/or the function icons 154 in user interface 140 (FIG. 1D), as shown in FIG. 1F, which presents a drawing illustrating a user interface 170. This user interface displays additional function icons 172 in addition to the function icons 154 displayed in user interface 160 (FIG. 1E) when icon 162-1 is activated. Additionally, the selective modification may be dynamically adapted over time based on subsequent user activities (including activating any of the icons 162), thereby allowing computer systems 200 in FIG. 2 and 300 in FIG. 3, which can be used to implement the selective modifying, to 'learn' which of the groups 152 and/or the function icons 154 in user interface 140 (FIG. 1D) are of interest to a given user at a particular time.

Figure 2:
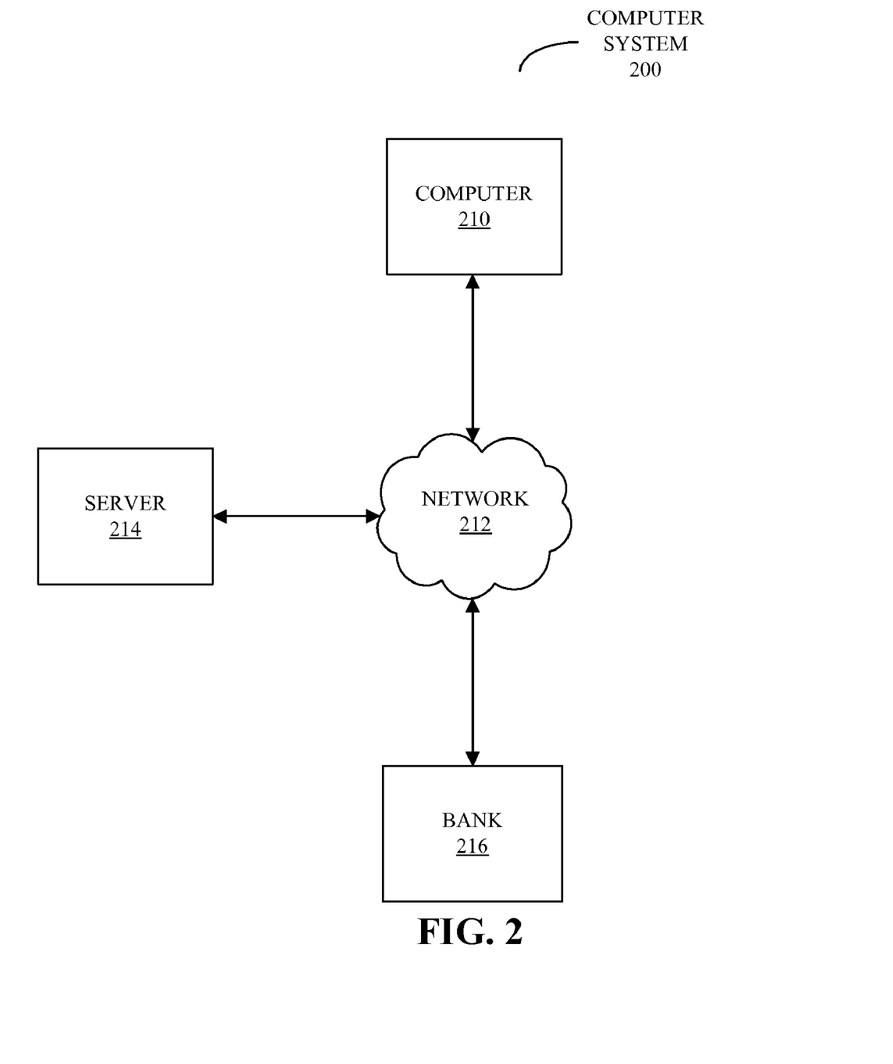
FIG. 2 is a block diagram illustrating a networked computer system that customizes the displayed content in a document in accordance with an embodiment of the present invention.

FIG. 2 presents a block diagram illustrating a networked computer system 200 that customizes displayed content in a document. As noted previously, the document may include web pages (such as those associated with collaborative systems) and/or user interfaces of software applications. In the discussion that follows, a user interface for a software application is used as an illustrative example.

In computer system 200, a user may use a software application, such as financial software, that is resident on computer 210. Alternatively, the user may utilize a software-application tool that is embedded in a web page. This web page may be provided by server 214 via network 212.

Note that the software-application tool may be a stand-alone application or a portion of another application (such as financial software that is resident on and/or that executes on server 214). In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing: JavaScript, ECMAScript instructions, VBScript instructions, or instructions in another programming language suitable for rendering by a web browser or another client application on the computer 210.

Over time, computer 210 (if the software application is resident on computer 210) and/or server 214 (if the software application is implemented as a software-application tool) may monitor and aggregate a log of user activities. As noted previously, this log may include the activities of one or more users (on multiple computers, such as computer 210), and the user activities may be associated with one or more software application (which may include the financial software).

Based on the monitored user activities, as well as other factors such as user preferences and/or a data rate of network 212, server 214 may provide instructions to computer 210 (if the software application is resident on computer 210) that customize the displayed content in a user interface for the software application. In particular, the displayed function icons, which are associated with features/functions of the software application, may be selectively filtered and/or modified. Thus, the total number of displayed function icons may be limited and/or function icons that are popular may be highlighted.

Alternatively, if the software application is implemented as a software-application tool, server 214 may provide a revised web page to computer 210. This revised web page may include a version of the software-application tool with customized content, e.g., the displayed function icons, which are associated with features/functions of the software application, may be selectively filtered and/or modified.

Computer 210 and/or server 214 may continue to monitor user activity after the displayed content is selectively modified. In this way, computer system 200 can continue to 'learn' what portion of the content associated with the application software is relevant or of interest to users, and can revise or update the displayed content (such as the displayed function icons) as the user activity evolves or changes by providing additional instructions or another revised web page to computer 210. For example, as noted previously, if the user repeatedly selects an icon that displays one or more additional function icons, these function icons may be added to the function icons displayed in the user interface for the software application (and other function icons that were displayed, but which were not regularly used, may be removed).

The log of user activities and financial information associated with the financial software (such as an account balance at bank 216 and/or an account history) for one or more users may be stored on server 214 and/or at one or more other locations in computer system 200 (i.e., locally or remotely). Moreover, because this information may be sensitive in nature, it may be encrypted. For example, stored information and/or information communicated via network 212 may be encrypted.

Computer 210 may be one of a variety of devices capable of manipulating computer-readable data or communicating such data between two or more computing systems over a network, including: a personal computer, a laptop computer, a portable electronic device (such as a cellular phone or PDA), and/or a client computer (in a client-server architecture). Moreover, network 212 may include: the Internet, World Wide Web (WWW), an intranet, LAN, WAN, MAN, or a combination of networks, or other technology enabling communication between computing systems.

In exemplary embodiments, the financial software includes software such as: Quicken™ and/or TurboTax™ (from Intuit, Inc., of Mountain View, Calif.), Microsoft Money™ (from Microsoft Corporation, of Redmond, Wash.), Splash-Money™ (from SplashData, Inc., of Los Gatos, Calif.), Mvelopes™ (from In2M, Inc., Draper, Utah), and/or open-source applications such as Gnucash™, PLCash™, and/or Budget™ (from Snowmint Creative Solutions, LLC, of St. Paul, Minn.).

Moreover, the financial software may include software such as: QuickBooks™ (from Intuit, Inc., of Mountain View, Calif.), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

Additionally, the financial software may include software such as: Quicken™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Computer system 200 may include fewer components or additional components. Moreover, two or more components may be combined into a single component, and/or a position of one or more components may be changed.

Figure 3:
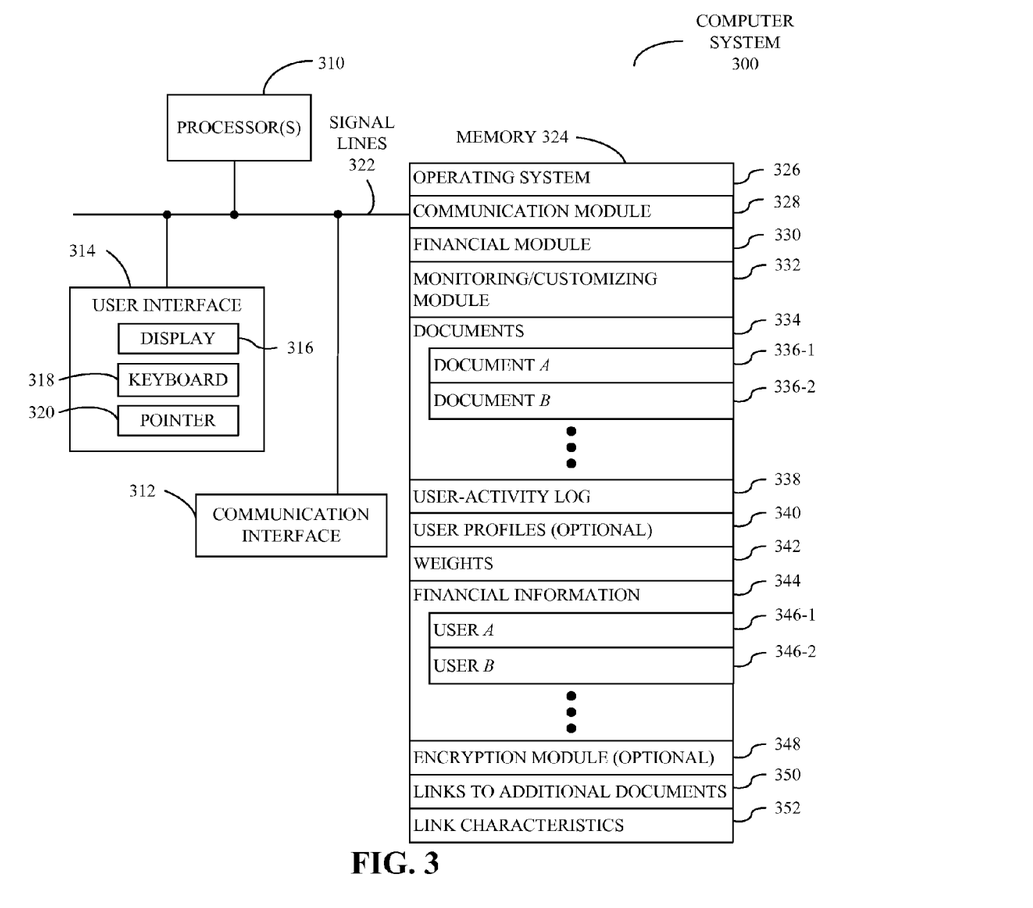
FIG. 3 is a block diagram illustrating a computer system that customizes the displayed content in a document in accordance with an embodiment of the present invention.

FIG. 3 presents a block diagram illustrating a computer system 300 that customizes displayed content in a document. Computer system 300 includes one or more processors 310, a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. While not explicitly indicated in the computer system 300, in some embodiments the operating system 326 includes a web browser. Memory 324 may also store procedures (or a set of instructions) in a communication module 328. These communication procedures may be used for communicating with one or more computers and/or servers, including computers and/or servers that are remotely located with respect to the computer system 300.

Memory 324 may also include multiple program modules (or a set of instructions), including: financial module 330 (or a set of instructions), monitoring/customizing module 332 (or a set of instructions), and/or optional encryption module 348 (or a set of instructions).

Monitoring/customizing module 332 may collect user activities in user-activity log 338 as one or more users view or interact with one or more documents 334, such as document A 336-1 or document B 336-2, during one or more sessions. Based on the user-activity log 338, optional user profiles 340, and/or weights 342, monitoring/customizing module 332 may identify relevant content in documents 334. Then, monitoring/customizing module 332 may selectively modify the displayed content in documents 334. In some embodiments, the displayed content is selectively modified based on link characteristics 352 (such as a maximum data rate).

The selectively modified documents may include icons and/or links to a remainder of the original content that users can selectively activate. For example, these links may include links to additional documents 350. Moreover, monitoring/customizing module 332 may continue to monitor subsequent user activities, which are stored in user-activity log 338, and which allow monitoring/customizing module 332 to dynamically modify the displayed content as a function of time, thereby maintaining a relevance and ease of use of documents 334.

In some embodiments, documents 334 are associated with financial module 330. For example, documents 334 may include one or more web pages associated with financial module 330. Moreover, using financial module 330 and one or more of documents 334, users may modify financial information 344, such as financial information for user A 346-1 or user B 346-2.

In some embodiments, at least some of the information stored in memory 324 and/or at least some of the information communicated using communication module 328 is encrypted using optional encryption module 348.

Instructions in the various modules in the memory 324 may be implemented in: a high-level procedural language, an object-oriented programming language, and/or in an assembly or machine language. Note that the programming language may be compiled or interpreted, e.g., configurable or configured, to be executed by the one or more processing units 310.

Although the computer system 300 is illustrated as having a number of discrete items, FIG. 3 is intended to be a functional description of the various features that may be present in the computer system 300 rather than a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more application-specific integrated circuits (ASICs) and/or one or more digital signal processors (DSPs).

Computer system 300 may include fewer components or additional components. Moreover, two or more components may be combined into a single component, and/or a position of one or more components may be changed. For example, financial module 330 and monitoring/customizing module 332 may be combined into a single module. In some embodiments, the functionality of the computer system 300 may be implemented more in hardware and less in software, or less in hardware and more in software, as is known in the art.

Figure 4:
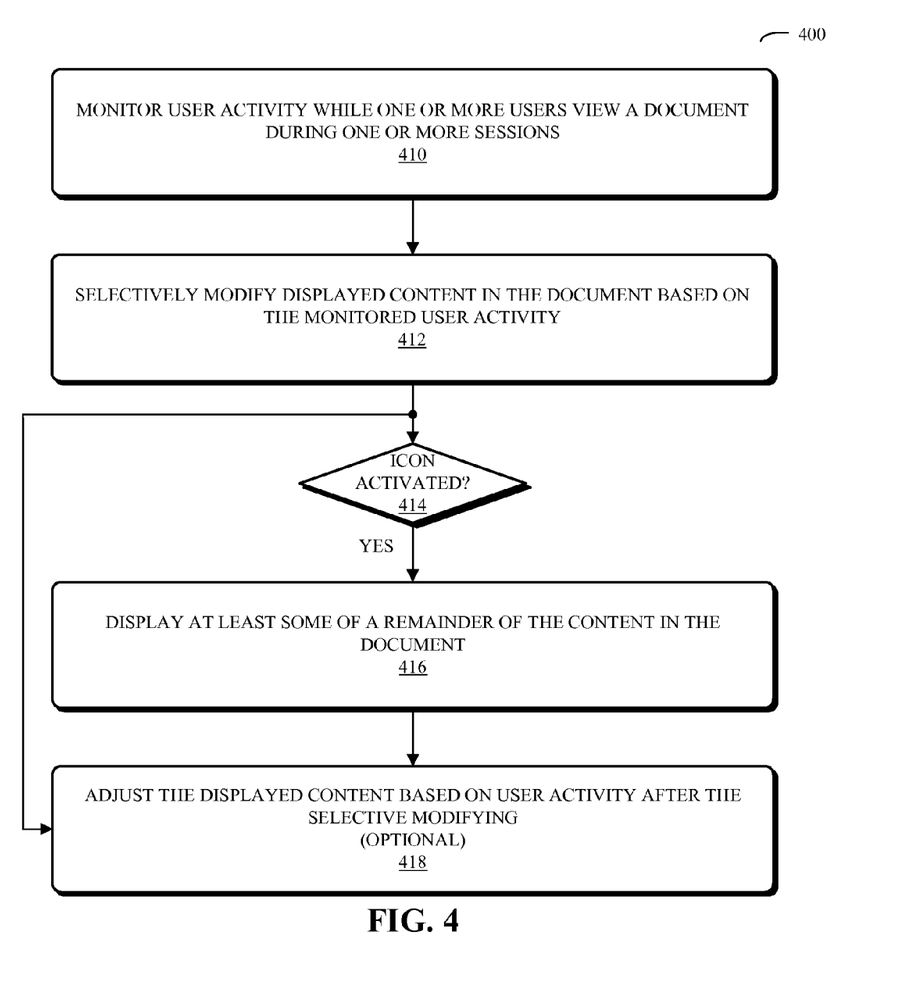
FIG. 4 is a flow chart illustrating a process for customizing the displayed content in a document in accordance with an embodiment of the present invention.

We now discuss processes for customizing displayed content in a document. FIG. 4 presents a flow chart illustrating a process 400 for customizing displayed content in a document, which may be performed by a computer system (such as computer system 200 in FIG. 2 and/or computer system 300 in FIG. 3). During operation, the computer system monitors user activity while one or more users view a document during one or more sessions (410). Then, the computer system selectively modifies the displayed content in the document based on the monitored user activity (412).

If a given icon is activated by a given user (414), the computer system may display at least some of the remainder of the content in the document (416). Moreover, the computer system may optionally adjust the displayed content based on user activity after the selective modifying (418).

In some embodiments of process 400, there may be additional or fewer operations. Moreover, the order of the operations may be changed, and/or two or more operations may be combined into a single operation.

Figure 5:
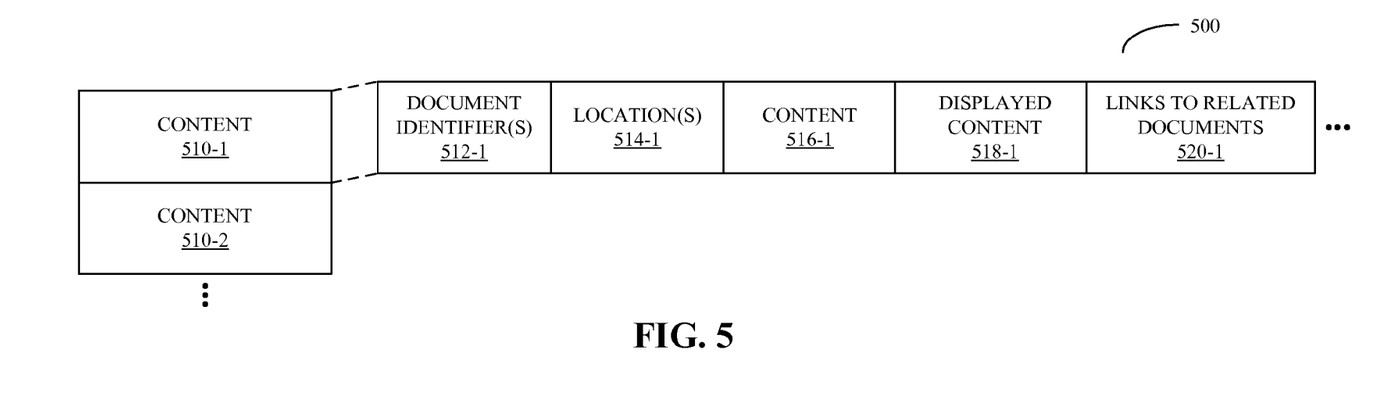
FIG. 5 is a block diagram illustrating a data structure in accordance with an embodiment of the present invention.

We now discuss data structures that may be used in computer system 200 (FIG. 2) and/or 300 (FIG. 3). FIG. 5 presents a block diagram illustrating a data structure 500. This data structure may include content 510 for one or more documents. For example, content 510-1 for one or more documents may include: one or more document identifiers 512-1, one or more locations 514-1 in the documents, corresponding content 516-1 at the one or more locations 514-1, displayed content 518-1, and links to related documents 520-1.

Figure 6:
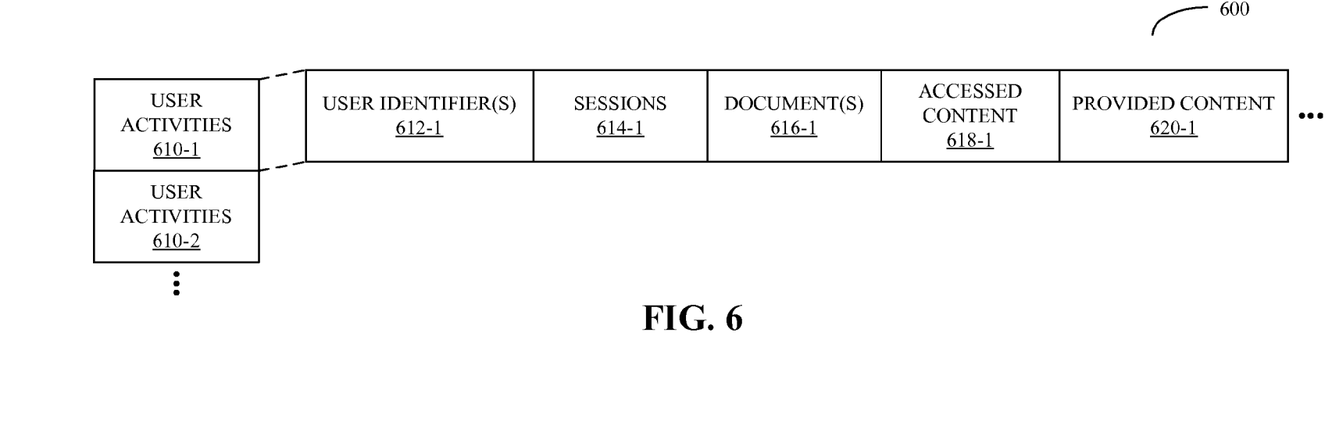
FIG. 6 is a block diagram illustrating a data structure in accordance with an embodiment of the present invention.

FIG. 6 presents a block diagram illustrating a data structure 600. This data structure may include user activities 610 for one or more users. For example, user activities 610-1 may include: one or more user identifiers 612-1, one or more sessions 614-1, documents 616-1, and/or user activities (including content that was accessed 618-1 or provided 620-1).

Note that that in some embodiments of the data structures 500 (FIG. 5) and/or 600 there may be fewer or additional components. Moreover, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for customizing displayed content in a document, comprising:
   displaying, by computer, content in a document;
   monitoring, by computer, activity of multiple users while the document is viewed by the multiple users during multiple sessions, wherein the user activity includes actions of the multiple users, and wherein the actions include creating new content in the document;
   determining, by computer, a bandwidth of a device displaying the document;
   identifying, by computer, content relevant to a user based on the monitored activity of the multiple users and the bandwidth, wherein identifying relevance includes tracking the multiple users who interact with the document;
   selectively modifying, by computer, the displayed content in the document by replacing the content irrelevant to the user with a simplified representation; and
   updating, by computer, the displayed content with the modified content, which comprises the simplified representation.

2. The method of claim 1, wherein the selective modifying of the displayed content involves selectively filtering content in the document so that a subset of the content is displayed; wherein the displayed content includes one or more icons that, when activated, allow the one or more users to access a remainder of the content.

3. The method of claim 2, wherein the selective filtering is performed dynamically.

4. The method of claim 2, wherein the one or more icons include one or more links to additional documents.

5. The method of claim 2, wherein, when a given icon is activated by a given user, at least some of the remainder of the content is displayed in the document.

6. The method of claim 1, wherein the selective modifying involves altering a format of at least a portion of the displayed content.

7. The method of claim 6, wherein the altering of the format involves highlighting at least a portion of the displayed content.

8. The method of claim 1, wherein the document corresponds to a software application; and
   wherein the customizing of the displayed content involves customizing a user interface for the software application.

9. The method of claim 8, wherein the displayed content includes one or more functions of the software application.

10. The method of claim 9, wherein the selective modifying limits a total number of function icons in the user interface to a pre-determined range of numbers.

11. The method of claim 1, wherein the document includes a social forum that is viewed by multiple users who can add content to the document.

12. The method of claim 1, wherein the document includes a web page that is accessed via a network.

13. The method of claim 1, wherein the multiple sessions include current sessions for the one or more users.

14. The method of claim 1, wherein the multiple sessions include one or more previous sessions for the one or more users.

15. The method of claim 1, wherein the one or more users include a group of users.

16. The method of claim 15, wherein the selective modifying is based on user activity of the group of users while viewing multiple documents; and
   wherein the multiple documents include the document.

17. The method of claim 1, wherein the one or more users include an individual, thereby allowing the displayed content to be personalized.

18. The method of claim 1, further comprising adjusting the displayed content based on user activity after the selective modifying.

19. The method of claim 18, wherein, if one or more users activate a given icon to display content that is currently hidden, the displayed content is modified.

20. The method of claim 1, wherein the selective modifying is based on a data rate of a link to a device that displays the displayed content.

21. The method of claim 1, wherein the selective modifying is based on a weighted summation of user activities; and
wherein different weights are associated with different subsets of the content in the document and different user activities.

22. A non-transitory computer-readable storage medium storing instructions that, when executed by a computer system, cause the computer system to perform a method for customizing displayed content in a document, the method comprising:
displaying content in a document;
monitoring activity of multiple users while the document is viewed by the multiple users during multiple sessions, wherein the user activity includes actions of the multiple users, and wherein the actions include creating new content in the document;
determining a bandwidth of a device displaying the document;
identifying content relevant to a user based on the monitored activity of the multiple users and the bandwidth, wherein identifying relevance includes tracking the multiple users who interact with the document;
selectively modifying the displayed content in the document by replacing the content irrelevant to the user with a simplified representation; and
updating the displayed content with the modified content, which comprises the simplified representation.

23. The non-transitory computer-readable storage medium of claim 22, wherein selectively modifying the displayed content involves selectively filtering content in the document so that a subset of the content is displayed; and
wherein the displayed content includes one or more icons that, when activated, allow the one or more users to access a remainder of the content.

24. The non-transitory computer-readable storage medium of claim 22, wherein selectively modifying involves altering a format of at least a portion of the displayed content.

25. The non-transitory computer-readable storage medium of claim 22, wherein the document corresponds to a software application; and wherein customizing the displayed content involves customizing a user interface for the software application.

26. A computer system, comprising:
a processor;
a memory;
a program module, wherein the program module is stored in the memory and configured to be executed by the processor, the program module including instructions for customizing displayed content in a document, wherein the instructions include:
instructions for displaying content in a document;
instructions for monitoring activity of multiple users while the document is viewed by the multiple users during multiple sessions, wherein the user activity includes actions of the multiple users, and wherein the actions include creating new content in the document;
instructions for determining a bandwidth of a device displaying the document;
instructions for identifying content relevant to a user based on the monitored activity of multiple users and the bandwidth, wherein identifying relevance includes tracking the multiple users who interact with the document;
instructions for selectively modifying the displayed content in the document by replacing the content irrelevant to the user with a simplified representation; and
instructions for updating the displayed content with modified content, which comprises the simplified representation.

\* \* \* \* \*